J. W. KECK.
PLOW.
APPLICATION FILED NOV. 11, 1914.
1,151,884. Patented Aug. 31, 1915.
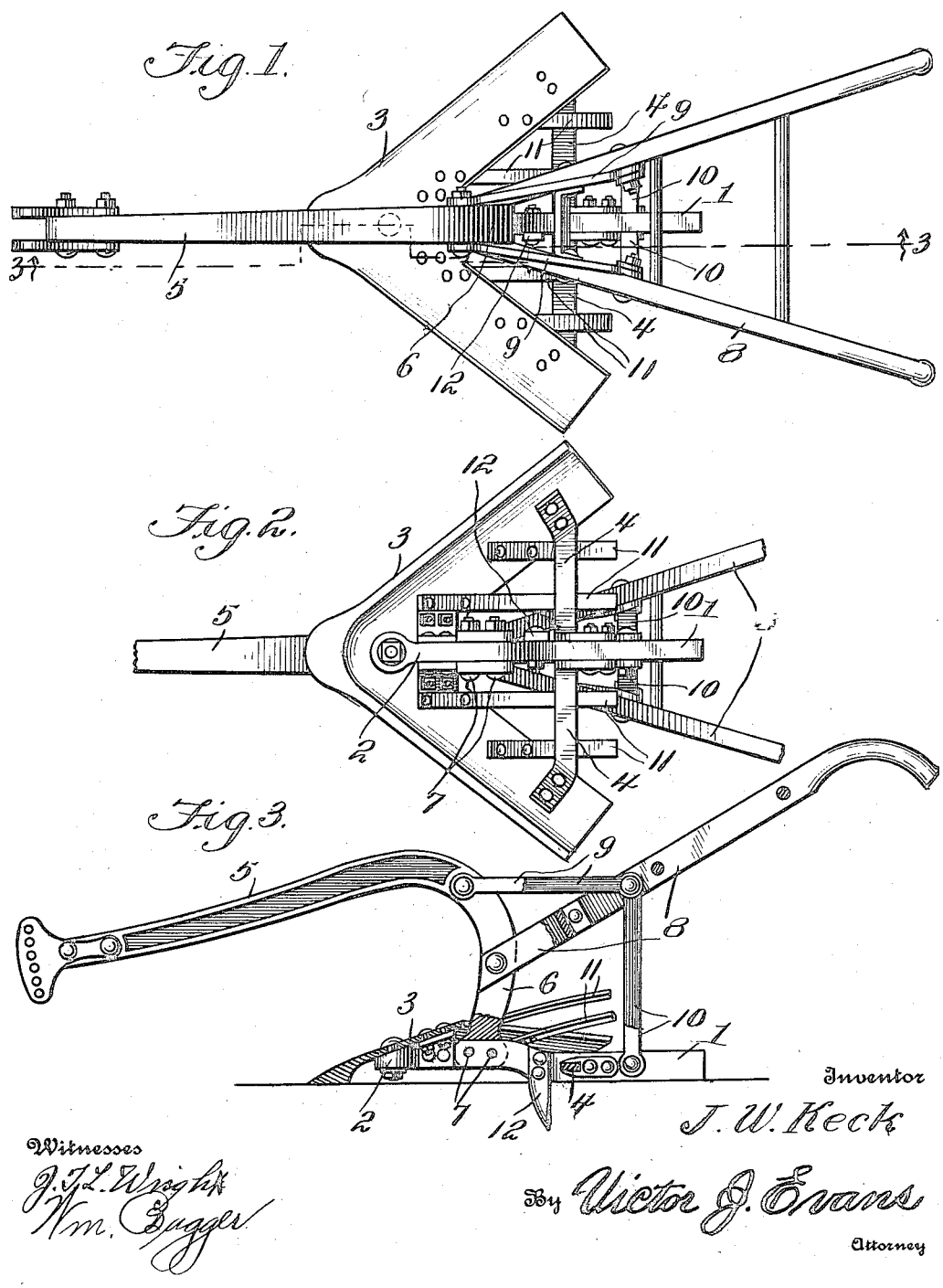

UNITED STATES PATENT OFFICE.

JAMES W. KECK, OF AUBURN, KANSAS.

PLOW.

1,151,884.  Specification of Letters Patent.  Patented Aug. 31, 1915.

Application filed November 11, 1914. Serial No. 871,543.

*To all whom it may concern:*

Be it known that I, JAMES W. KECK, a citizen of the United States, residing at Auburn, in the county of Shawnee and State of Kansas, have invented new and useful Improvements in Plows, of which the following is a specification.

This invention relates to plows, and it has for its object to produce a plow adapted to operate between the rows of corn stalks or the like for the purpose of breaking, loosening and disintegrating the soil preparatory to listing the same.

A further object of the invention is to produce a plow that will prepare the ground for listing, but at the same time leave it substantially level and in condition to absorb grain and moisture without danger of washing away.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view of a plow constructed in accordance with the invention. Fig. 2 is a bottom plan view of the same. Fig. 3 is a longitudinal sectional view taken on the line 3—3 in Fig. 1.

Corresponding parts in the several figures are denoted by like characters of reference.

A center bar 1 is provided having an upwardly off-set front portion 2 on which the V-shaped shovel 3 is bolted or otherwise secured, the wings of the shovel being connected with the center bar by means of braces 4. The beam 5 has a standard 6 which may be bifurcated to straddle the offset portion 2 of the center bar with which it is connected by fastening means such as bolts or rivets 7. Handles 8 are bolted on the standard, and are also connected with the standard and with the center bar by means of braces 9, 10. The wings of the mold board are provided with rearwardly extending fingers 11 which are preferably parallel to each other and to the center bar. The center bar 1 is provided adjacent to its upwardly offset portion with a downwardly extending tooth or cutter 12 which will dig into the soil as deeply as may be desired and which will also serve to steady the operation of the plow.

The V-shaped shovel is intended to be made of ample width, say, from 24 to 30 inches, according to the distance between the rows. When drawn through the ground at a proper depth the soil will be loosened, lifted and broken by the action of the plow wings and the rearwardly extending fingers, and the soil, being thus substantially pulverized, will be left level and in excellent condition to absorb and retain moisture. This is found preferable to double listing which involves the necessity of throwing the soil into a ridge which will be left dry, if not washed away by heavy rains. By the upwardly offset front portion 2 of the center bar frictional contact with the ground is reduced, and room is provided to accommodate the dirt which is displaced forwardly by the action of the cutting member 12.

The general construction of my improved plow is simple and inexpensive, and it will be found thoroughly efficient for the purposes for which it is provided.

Having thus described the invention, what is claimed as new, is:—

1. A plow of the character described comprising a center bar having an upwardly offset front portion, a V-shaped shovel mounted thereon, braces connecting the wings of the shovel with the center bar, a beam having a standard connected with the upwardly offset portion of the center bar, handles connected with the standard, and braces connecting said handles with the standard and with the center bar.

2. A plow of the character described comprising a center bar having an upwardly offset front portion, a V-shaped shovel mounted thereon and having wings provided with rearwardly extending fingers, a beam having a standard connected with the center bar, braces connecting the center bar with the wings of the shovel, and suitably supported handles.

3. A plow of the character described comprising a center bar having an upwardly offset front portion and a downwardly extending tooth adjacent thereto, a V-shaped shovel mounted on the forward portion of the center bar and having wings provided with rearwardly extending fingers, braces connecting the wings of the plow with the center bar, a beam having a standard connected with the center bar, handles mounted on the standard, and braces connecting the handles with the standard and with the center bar.

In testimony whereof I affix my signature in presence of two witnesses.

JAMES W. KECK.

Witnesses:
S. V. FIRESTONE,
CLOYCE BENEDICT.